United States Patent [19]

Gilpatric

[11] 4,231,322

[45] Nov. 4, 1980

[54] APPARATUS FOR GROWING OYSTERS AND OTHER MOLLUSCS

[76] Inventor: Donald S. Gilpatric, 4304 Gifford Pinchot Dr., Annandale, Va. 22003

[21] Appl. No.: 53,858

[22] Filed: Jul. 2, 1979

Related U.S. Application Data

[62] Division of Ser. No. 925,765, Jul. 18, 1978, Pat. No. 4,186,687.

[51] Int. Cl.³ .............................................. A01K 61/00
[52] U.S. Cl. .......................................................... 119/4
[58] Field of Search .................................... 119/4, 3, 2

[56] References Cited

U.S. PATENT DOCUMENTS

| | | | |
|---|---|---|---|
| 239,592 | 3/1881 | Weems | 119/4 X |
| 249,942 | 11/1881 | Hughes | 119/4 |
| 1,290,467 | 1/1919 | Wooster | 119/2 |
| 3,766,888 | 10/1973 | Wiegardt, Jr. | 119/4 |

FOREIGN PATENT DOCUMENTS

855799  5/1940  France ......................................... 119/4

*Primary Examiner*—Hugh R. Chamblee

[57] ABSTRACT

A method is disclosed in which cultchless young oysters of a selected size taken from seed stock are placed in a first set of foraminous cribs and the first set of foraminous cribs are then placed on a shelf within an open top receptacle where the young oysters are protectively housed within the receptacle intermediate the top and bottom of the receptacle. Immature oysters of a larger size than the oysters placed in the first set of cribs are placed in a second set of foraminous cribs and the second set of foraminous cribs are placed across the open top of the receptacle above the first set of cribs. The second set of cribs are lashed to the top of the receptacle, whereupon the receptacle with its oyster containing cribs supported thereon are lowered to the bottom of a body of water where it is allowed to remain for a predetermined oyster growth period. The receptacle and trays may be raised periodically for inspection, and for culling from the second set of cribs the mature oysters, and for culling from the first set of cribs immature oysters above a predetermined size which are then placed in the second set of cribs where they are allowed to reach maturity. The apparatus of this invention comprises the receptacle described above in subcombination and in combination with the foraminous cribs.

15 Claims, 7 Drawing Figures

APPARATUS FOR GROWING OYSTERS AND OTHER MOLLUSCS

This is a division of application Ser. No. 925,765, filed July 18, 1978, now U.S. Pat. No. 4,186,687.

BACKGROUND OF THE INVENTION

1. Field of Invention

This invention relates to a new method and apparatus for the rearing and maturing of oyster seed stocks and other molluscs through aquaculture in off-bottom, corrosion-proof, freely movable cradles which support foraminous trays or cribs of varying mesh sizes containing cultchless young oysters at different growth stages.

2. Prior Art Relating to the Disclosure

The reproductive cycle of the oyster in its natural state usually centers in areas of acceptable water environment where reefs or beds of oysters can develop on firm bottom substrate and successively spawn free-swimming larvae which attach themselves to the shells of their predecessors and grow to maturity. The protein food value of oysters, and the relative simplicity of concentrating their self-renewing production capabilities in properly selected growth environments, led originally to the development of culture techniques in the early years of the Roman Empire. These were extended to, and adapted in many parts of Western Europe and the British Isles in succeeding centuries. Oyster meats were a prime source of protein for mass urban consumption in the Elizabethan era, for example, and one mainstay of the U.S. East Coast seafood diet in the mid-Atlantic coastal areas during the late 19th and early 20th centuries.

Beginning in the 1930's, when domestic and foreign oyster production began to fall off rapidly due variously to pollution, diseases, unanticipated new forms of predation, and destruction of natural bed areas as well as nutrient source wetlands, a number of research programs were undertaken in the U.S.A. and elsewhere to reverse the lowering production trends for edible shellfish. Remedies were sought in two broad areas:—by studies of the "natural" breeding and growth problems and developing corrective measures and techniques therefor, and by introducing systems for "aquaculture", which has since become a term generally used to describe off-bottom culture methodologies. In this latter field, innovations followed several different patterns. Rafts or floats were used to suspend ropes and shellfish shell strings to permit naturally spawned larvae to attach themselves to a cultch or artificial bed regardless of actual bottom conditions at the sites. Hatchery techniques were developed to produce cultchless (separately nutured) oyster seed which could be grown in foraminous trays suspended off-bottom under rafts. These and other aquaculture concepts projected widespread extension of water areas suitable for oyster production, substantial reduction of predation, uniform shell growth and size etc. The techniques developed to achieve these objectives have, so far, proved relatively costly to apply, however, and private enterprise capital has not yet been significantly attracted to shellfish aquaculture as a profitable way to exploit those potentially massive renewable marine resources in many of the coastal and estuarine areas of the U.S.

SUMMARY OF THE INVENTION

This invention relates to an improved method and apparatus for the growing of oysters and other molluscs in foraminous cribs which are supported off the bottom of a natural body of water by an open-top receptacle which rests on the bottom of the body of water and protects the young oyster and other molluscs from predators.

It is an object of this invention to provide an improved method and apparatus for growing oysters which permits achievement of most of the advantages, while minimizing the disadvantages of both the traditional bottom culture methods and modern-day off-bottom aquaculture techniques.

It is a further object of this invention to provide improved apparatus for growing oysters starting with hatchery bred seed stocks. The apparatus includes a molded plastic, elongated, open top, oblong receptacle which will also be referred to as a cradle in this specification. The cradle has a generally flat rectangular bottom with upwardly and outwardly sloping sides and end walls. The sides and end walls are offset intermediate the bottom and open top of the cradle, and a continuous shelf, or ledge which is substantially parallel with the bottom of the receptacle connects the offset upper and lower portions of the side and end walls. A continuous, outwardly extending lip is provided around the top of the side and end walls, and a continuous flange depends from the outer edge of the lip to provide a predator barrier. Openings are provided at intervals along the lip for connecting ropes and lashings to the cradle. Drains are provided in the bottom of the cradle to allow water to enter or leave the receptacle, and they may be plugged and unplugged as desired. The cradle is otherwise imperforate. The plastic material from which the cradle is molded is preferably glass fiber reinforced to provide strength and rigidity. The plastic material is selected for its durability under conditions encountered when immersed in sea water at various temperatures of the natural environment.

The apparatus of this invention further includes for use in combination with the cradle above described, a plurality of foraminous, box-like oyster containers which will be sometimes referred to in this specification as cribs. Two sets of multiple cribs are provided. One set of cribs has openings of smaller mesh than the other set for holding smaller oysters than the second set. The cribs of the first set are designed to fit within the cradle and rest on the continuous shelf therein while the cribs of the second set are designed to be supported transversely upon the open top of the cradle and to overhang the sides thereof. Young oysters, taken from nursery seed stock, are placed in the first set of cribs and are held there for an indefinite growth period until they reach a selected size before maturity. After the young oysters have reached the selected size, they are removed from the first set of cribs and placed in the second set of cribs where they are allowed to remain until they reach maturity. The cribs are preferably made of corrosion-proof materials, such as molded plastic and plastic coated wire mesh.

The cradles of this invention can be manufactured in various sizes within practical design limits, and the cribs must be built to specifications considering the size of the cradles. Cradles which are too large cannot be handled readily without lifting machinery, and cradles which are too small would present other disadvantages. By way of example, cradles approximately ten feet long, two feet wide and one foot deep have been found to be of a satisfactory size and to be a feasible compromise of measurement, maneuverability and holding space options possible in relation to production costs and end-use adaptability.

Advantages of the present invention over the traditional natural bottom oyster culture are:

A. Cradles are usable on any bottom substrate where water environment in tidal or intertidal coastal/estuarine sectors is conducive to good growth for oysters and other molluscs, and regardless of whether the substrate is rocky, mud, sand or some mixture of these elements.

B. Cradles are easily movable to adapt to various current and feeding conditions, water depths, stock inspection and cleaning requirements, overwintering, storage, etc.

C. No expensive carrying or motorized gear is required for cradle culture. Units can be floated under their own displacement to lowering sites, which direct rope line recovery in shallow or intertidal waters, and easy retrieval by use of flotation equipment when settled in deep water.

D. Cradle culture will minimize or eliminate most destructive predators which attack natural or bottom oyster beds, since the design of the equipment blocks access to growth stocks by starfish, snails, mudworms, crabs etc.

E. The cradles also protect culture stocks from damage or destruction due to siltation or detritus accumulation in growing seasons, or during overwintering storage.

F. The cradle size permits highly flexible culture operations: e.g. for small group consumption or commercial marketing; for part-time or off-hour supplemental income creation; for producer/cooperative profit development and for long or short term safe underwater storage of mature stock.

G. Cradles are also usable without design modification as flumes for on-shore growth of small oyster spat or seed stocks to minimum rearing sizes under a controlled water and nutrient supply system.

Advantages of the present invention over raft or surface culture are:

Cradles are much less expensive and much more durable equipment to purchase and maintain.

Cradle culture offers no hazards to navigation in production areas and no surface location markings for cradles off bottom would be required.

Cradle culture eliminates the problems of unpredictable surface water currents and movements which adversely affect oyster growth at the higher levels of the water column under rafts.

The handling, inspection and cleaning of cradle-supported cribs or trays is simpler and substantially less costly than for crib or tray stocks in raft culture operations.

No mechanical or motor powered equipment is required for cradle culture although such added capital investments are essential for raft culture on a commercial operations scale.

Cradles are weatherproof for operating use, and not subject to storm, winter or collison damage.

Cradles require no anchoring or holding gear, and no excess weight carrying capacity for access and servicing of undersuspended trays or cribs, as is the case in raft culture.

Other important advantages of the invention are:

The appropriate technology involved is simple, self-explanatory and highly adaptable vis-a-vis community or individual end-user needs, change agents, experience requirements and resource demands. Prospects for widespread expansion of aquaculture in the U.S. are contingent on these axiom conditions.

Auxiliary equipment requirements for application of cradle culture methodology are minimal—e.g. a skiff or rowboat will be adequate for working and inspection transportation purposes, whereas a powered boat is normally essential for raft culture operations. Motor power discharges and materials which corrode in seawater damage or kill growing oysters in the rearing stages will therefore be avoided.

Cradle culture techniques present minimal land and shore use complications. They can be used—for intertidal waters especially—in most shore areas under municipal, state or federal domain with public access, without impact on the other uses of such riparian rights.

The environmental impact advantages of the invention are impressive. In wetlands and estuarine areas, the cradle technology can be applied with no surface water evidence or disturbance to establish wildlife, and with no pollution-creating adjuncts or effects on the food-chain producing cycles.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which.

DESCRIPTION OF THE PREFERRED EMBODIMENT

Figure 1:
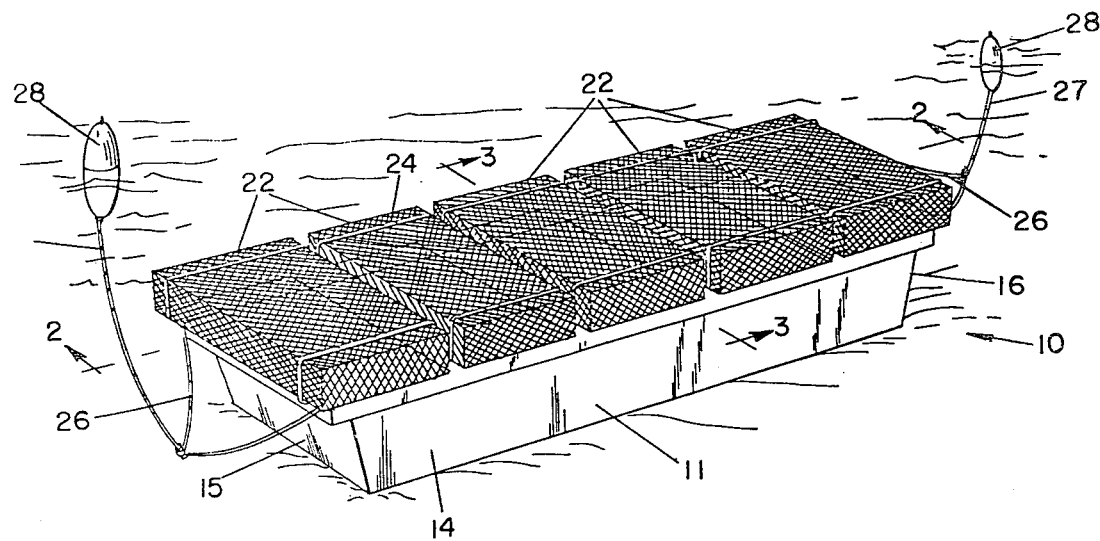
FIG. 1 is a perspective view showing the apparatus of this invention in place on the bottom of a natural body of water selected for growing oysters.
Figure 4:
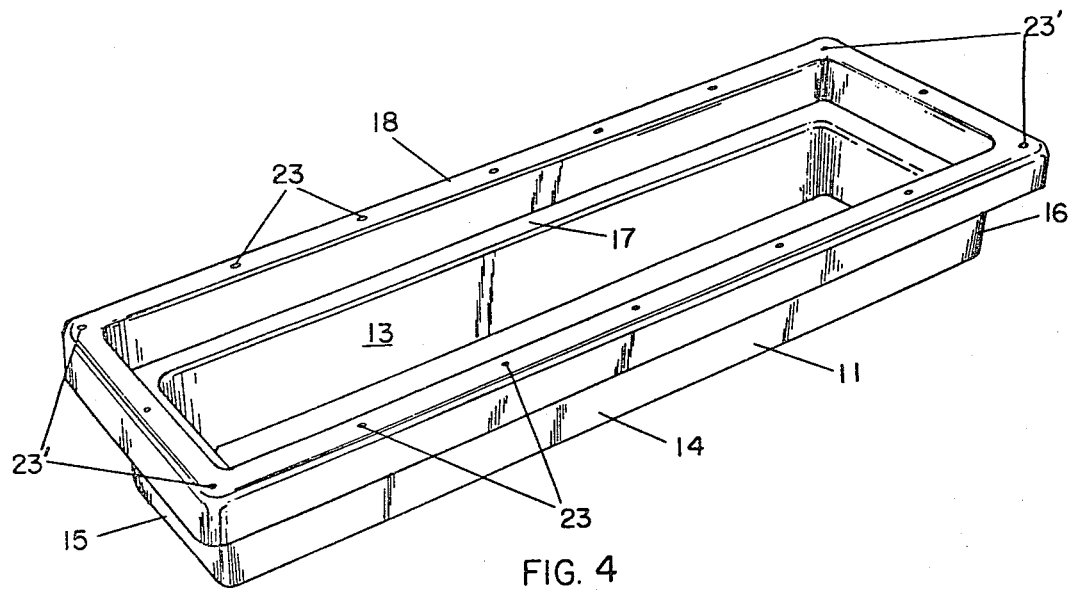
FIG. 4 is a perspective view of one of the cradles of this invention without the oyster cribs mounted thereon.

Referring to the drawings and particularly to FIG. 1, the apparatus 10 according to this invention for sustaining the growth of oysters and other molluscs is shown resting upon the bottom of a natural body of water. The apparatus 10 comprises an elongated, open top, rectangular, molded plastic receptacle or cradle 11. The cradle 11 as best seen in FIG. 4 has a flat, rectangular bottom 12, upwardly sloping opposite sides 13 and 14, and upwardly sloping ends 15 and 16. A continuous shelf 17 is formed below the open top of the cradle 11 by offsetting the top portions of the sides 13 and 14 and of the ends 15 and 16 from the bottom portions thereof. The shelf 17 is substantially parallel with the bottom 12 and with a continuous lip 18 which extends outwardly from the sides 13 and 14 and ends 15 and 16. A continuous flange 19 depends from the continuous top lip 18 and together with the top lip 18 forms a barrier for preventing bottom dwelling predators, such as star fish, oyster drills and others from reaching the oysters contained in formaminous containers or cribs which are supported upon the cradle 11.

The cradle 11 is designed to support a series of small oyster rearing cribs 21 upon the shelf 17, and a series of larger oyster maturing cribs 22 upon the top of the cradle. The rearing cribs 21 are for use in rearing young oysters obtained from nursery stock to a certain size, while the maturing cribs 22 are for use in maturing oysters to full growth after they are taken from the rearing cribs 21.

Figure 2:
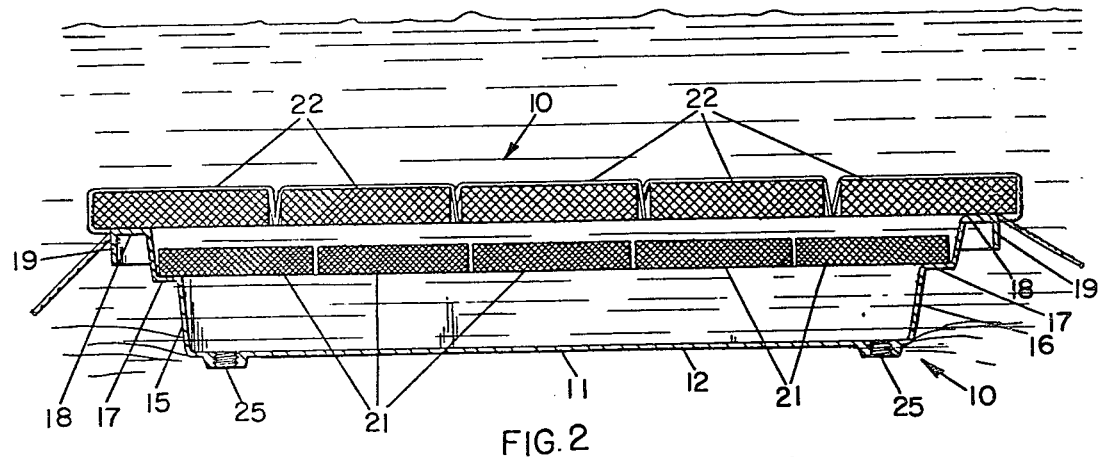
FIG. 2 is a longitudinal sectional view taken on lines 2—2 of FIG. 1.
Figure 3:
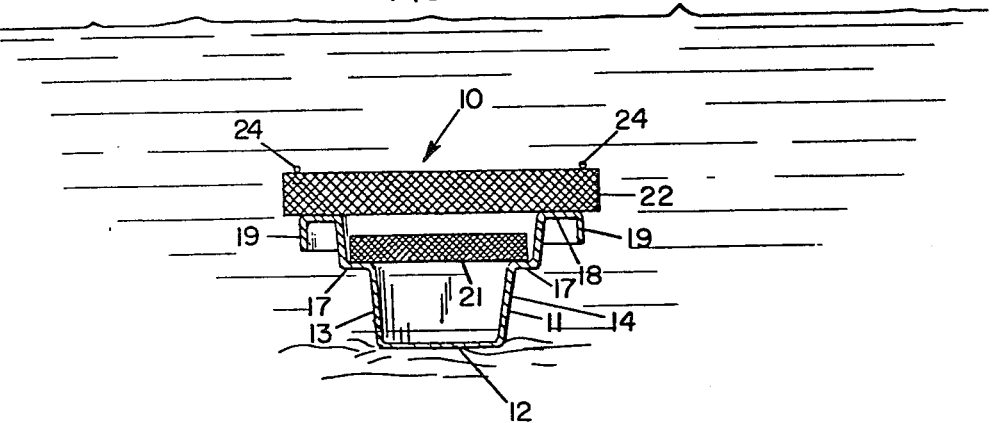
FIG. 3 is a transverse sectional view taken on lines 3—3 of FIG. 1.
Figure 7:
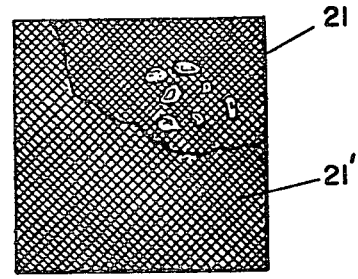
FIG. 7 is a top plan view of one of the oyster rearing cribs with top partially broken away to show the interior of the crib.

The rearing cribs 21 as shown in FIG. 7 are preferably square and of a width to fit between the upper portions of the cradle side walls 13 and 14 so that the cribs will rest upon the opposite ledges of the shelf 17. The height of the cribs 21 is less than the distance from the shelf 17 to the top of the cradle 11 so that a series of cribs 21 may be supported on the shelf with their top below or flush with the level of the continuous top lip 18. FIG. 2 shows a set of five of the rearing cribs 21 in place on the continuous shelf 17. FIG. 3 shows one of the cribs 21 with its opposite ends resting on opposite side portions of the continuous shelf 17 with sufficient room to fit freely between the upper portions of opposite side walls 13 and 14. The distance between the continuous shelf 17 and the cradle bottom 12 is sufficient so that detritus from oysters held in the cribs 21 will drop onto the bottom of the cradle and accumulate without reaching the level of the cribs 21 during the normal period between periodic servicing of the cradle and its oyster containing cribs.

While the smaller rearing cribs 21 may be made from various foraminous materials with openings of a predetermined mesh size, it has been found satisfactory to construct the rearing cribs 21 with top and bottom screen covers with holes varying usually from fiberglass screen cloth mesh size (for small oyster spat of 2-5 mm. diameter) to $\frac{1}{4}''$ mesh molded plastic wire which will support oysters of 6-15/20 mm. shell diameter. The sides of these cribs or trays may be of molded foraminous plastic or solid wood slabs, with preferable depths of approximately 3". The perforations in the top and bottom crib covers permit circulation of nutrient-bearing off-bottom currents, but without current strengths through the sides which would tend to damage small oyster shell edges and thus impede spat growth. As an alternative to solid sidewalls in the smaller cribs, two or more of these frame members may be made wholly or partly foraminous and then set with tops extending above the cradle lips 18 to let more water and waterbourne nutrients through to the young oysters during the latter stages of rearing growth. The larger cribs 22 at such periods would be supported by the tops of the smaller cribs 21, but would still be lashed to the lips 18 of the cradle sides through the holes 23 therein.

Figure 5:
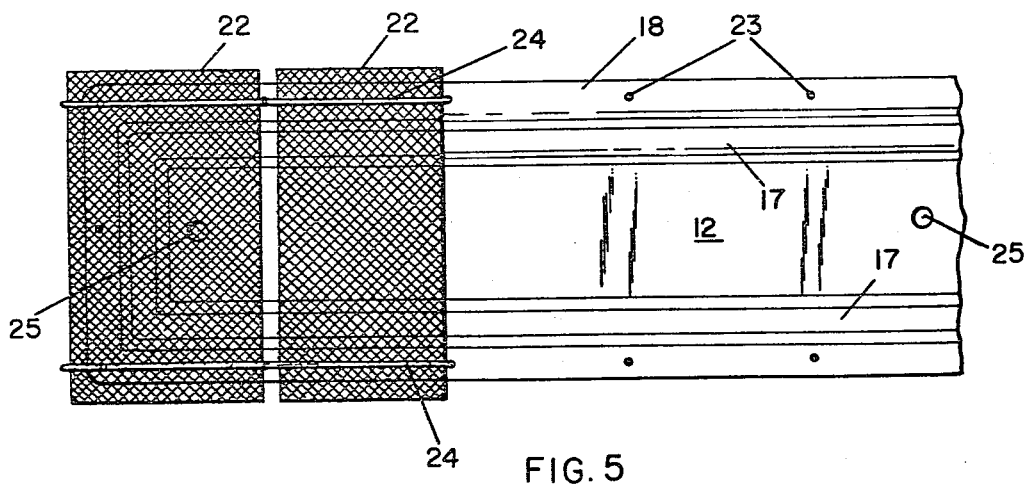
FIG. 5 is a partial top plan view of a portion of the cradle shown in FIG. 4 with two of the oyster maturing cribs lashed to the top thereof.
Figure 6:
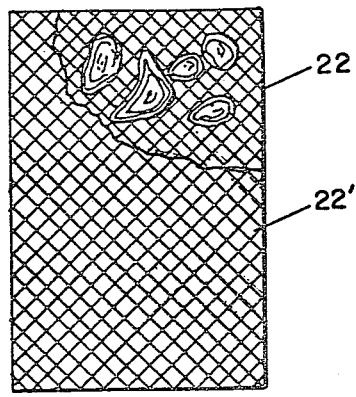
FIG. 6 is a top plan view of one of the oyster maturing cribs with top partially broken away to show the interior of the crib.

The larger oyster maturing cribs 22 are rectangular in shape and are of a length such that when the cribs 22 are placed on top of the cradle 11 with their long axis transverse to the length of the cradle, the ends of the cribs 22 will extend beyond the opposite side flanges 19 of the cradle. FIG. 1 shows a set of five of the oyster maturing cribs 22 lashed to the top of the cradle 11 by means of lashings 24 which extend through the holes 23 provided in the lip of the cradle as seen in FIG. 5. FIGS. 2 and 3 show how the larger cribs 22 are superimposed on the cradle lip 18 over the oyster rearing cribs 21.

The larger cribs 22 are preferably constructed—except for the tops thereof—from vinyl-covered wire of approximately 3/32nds" diameter with mesh varying from $\frac{1}{2}$ to $\frac{3}{4}''$ to 1" to 2" apertures, depending on the size of the oysters to be set in these cribs to grow to maturity or market size. These larger cribs would also have two lateral separating barriers (not shown) made of vinyl covered wire to create three compartments in each crib of approximately equal size to insure balance control of the cradle when fully loaded. Normally, the top covering of each large crib would be molded plastic wire with mesh larger than the other crib wall sections to permit increased circulation of nutrient bearing currents to the maturing oyster stocks. The guiding measurement standards for large crib mesh sizes are to have vinyl-covered wire square holes slightly smaller than the minimum diameters of the shells of the oysters to be set in these cribs for different periods during which growth occurs over a 2-3 year maturing span.

Referring to FIGS. 2 and 5, a pair of drain holes 25 are shown in the cradle bottom 12 centered between the side walls, with one hole spaced inwardly from each end. These holes have threaded interiors for receiving threaded drain plugs or optionally threaded pipes. The holes can be plugged when the cradle is used as a surface raft to be floated with its cribs to different off-bottom location sites under its own displacement. When the cradle is properly located for submerging, the holes 25 are unplugged and they function as seacocks to allow the cradle to sink to the bottom. The cradle 11, with the drain holes 25 open, remains situated on the bottom of the body of water under its own weight and the weight of the oyster containing cribs 21 and 22 without the need for anchors. The holes 25 may also be left open as drains when the cradle 11 is beached for stock checking, crib cleaning and detritus or silt removal. When the cradle 11 is used as a flume for on-shore rearing of oyster spat, pipes may be threaded into the holes 25.

The holes 23' in the cradle lip 18 at each corner of the cradle have different potential uses. They may be used to fix two loops 26 at either end of the cradle for lifting the cradle from deep water substrate with flotation gear and the power of flooding tides to transfer the cradle to shallow intertidal water for inspection, cleaning etc. They may also be used for the attachment of hauling ropes when cradles are being beached for crib substitutions, adjustments or load changes. These holes are also for attachment of one or two end baffles to modify the cradle as a flume for on-shore rearing of oyster spat in connected decks or single unit use to provide controlled flow of water and nutrients over and under the smaller cribs 21 of oysters set on the shelves of the cradle apparatus.

To mark the position of the sunken cradle 11 with its oyster containing cribs 21 and 22, marker buoys 28 are attached to the rope loop 26 at opposite ends of the cradle by means of rope leaders 27.

Referring again to FIG. 1, five of the large cribs 22 are shown in normal position when lashed to the cradle and supported by the lips 18 or top flanges. The substantial overhang of the large crib ends as indicated permits maximum water bourne nutrient circulation and current cleansing of the larger oysters in each crib with their detritus dropping free of the cradle lips and bottom. The sizes of the cribs, both large 22 and small 21 are designed to permit balanced placement and volume storage of small, medium and large-sized oysters to meet the crib bottom space capacities for these categories of rearing and maturing stocks. Users of the cradles and cribs can therefore be given scientifically-based instructions as to quantities of different sized oysters to be grown under the cradle system with a self-cycling optimum productivity for each cradle achievable with starting hatchery-bred small stocks of seed oysters after an initial 2-year process initiation period under minimally acceptable coastal estuarine water environment conditions.

The tops 21' and 22' of the cribs 21 and 22 respectively may be opened for access into the interior of the cribs.

The method of this invention relates to the rearing and maturing of oysters in natural bodies of water containing oyster sustaining nutrients. The method comprises placing young, cultchless oysters of a selected size taken from seed stock in a first set of foraminous cribs 21, and placing the first set of cribs 21 on the shelf 17 of the cradle 11 as shown in FIG. 2. Oysters of a larger size, but not yet mature, are placed in a second set of cribs 22 and the cribs 22 are placed transversely across the cradle 11 and lashed thereto in the manner shown in FIGS. 1–3 and 5. The cradle 11, supporting the oyster containing cribs 21 and 22, is then floated to a location in tidal or intertidal waters selected for growing the oysters, and is sunk to the bottom by removing drain plugs from the drain openings 25, allowing water to enter the cradle whereupon it sinks under its own weight and the weight of its load. The bottom location for sinking the cradle is chosen to be at a depth below the depth at which surface traffic will be obstructed by the cradle and cribs and below the depth at which freezing of the water will occur during the coldest winter weather at the location. In summer, however, the cradle with its cribs may be moved to a different location where the oysters will have the benefit of warmer water at less depth. The cradle and cribs are raised periodically for inspection, cleaning and sorting according to size. Oysters in the maturing cribs 22 are culled out and sent to market or otherwise used; oysters in the rearing cribs 21 which have reached a predetermined size are removed from the cribs 21 and distributed in the cribs 22. Young replacement oysters taken from seed stock are placed in the cribs 21 to replace the oysters taken out and the cradle with its cribs are again floated to a selected location for oyster growth where it is again sunk to the bottom and allowed to remain for another growth period.

By way of example, the oysters selected for rearing in the cribs 21 are preferably within range of from $\frac{1}{3}''$ to $\frac{1}{2}''$ in size and they will grow to about 1 inch. Oysters selected for maturing in the cribs 22 are preferably at least $\frac{3}{4}''$ in size and they will be allowed to grow to maturity of a size suitable for marketing.

While the method has been described for growing oysters, it is applicable to the growing of other molluscs.

The invention has been described in detail for the purpose of illustration, but it will be obvious that numerous modifications and variations may be resorted to within the spirit and scope of the invention without departing from the claims.

What is claimed is:

1. Apparatus for sustaining the growth of oysters and other molluscs in multiple water environments comprising in combination an elongated open-top receptacle which can be moved and placed on any form of coastal or estuarine bottom strata with tidal seawater flows containing adequate nutrients and other marine environmental requirements for the growth of oysters and other molluscs, and plural sets of multiple foraminous cribs for containing oysters and other molluscs of various sizes for off-bottom rearing and maturing to marketable qualities, said receptacle having a bottom, opposite side walls and end walls extending upwardly from said bottom, support means intermediate the open top and bottom of said receptacle supporting and protectively housing a first set of said foraminous cribs side by side within said receptacle, said second set of foraminous cribs being supported side by side, transversely across the open top of said receptacle and superimposed over said first set of cribs, said first set of cribs having smaller size openings than the openings of said second set adapting said first set of cribs to contain oysters of a smaller size than the cribs of said second set.

2. The apparatus of claim 1 wherein said bottom has drain means therein which may be selectively opened or closed.

3. The apparatus according to claim 1 wherein said means for supporting said first set of cribs comprises a continuous shelf formed within said receptacle, and said receptacle has a continuous lip at the top thereof extending outwardly from said side and end walls.

4. The apparatus of claim 3 wherein said receptacle has an integral continuous flange depending from said lip at its outer edge which constitutes a barrier to shellfish predators which are by nature bottom dwellers in tidal and intertidal seawaters.

5. The apparatus of claim 3 wherein said opposite side walls and opposite end walls have upper and lower wall portions, said upper portions being offset laterally outwardly from said bottom portions, and said continuous shelf being a ledge joining said upper and lower wall portions.

6. The apparatus of claim 3 wherein said continuous lip has a plurality of apertures therein, and lashings being secured to said lip through said apertures in said lip for lashing said second set of cribs to the top of said receptacle.

7. The apparatus of claim 6 wherein at least one rope loop is attached to one end of said receptacle through selected apertures in said lip, and a market buoy is connected to said rope loop by a rope leader.

8. The apparatus of claim 1 wherein said receptacle is formed of molded plastic material which is substantially free from corrosion by sea water.

9. The apparatus of claim 8 wherein said molded plastic material is reinforced with glass fiber.

10. Apparatus for supporting plural sets of multiple foraminous cribs containing oysters or other molluscs off the bottom of a natural or other body of water which is conducive to the culture of oysters or other molluscs comprising an elongated open-top rectangular receptacle of molded plastic material, said receptacle having an elongated rectangular bottom, a pair of opposite side walls, and a pair of opposite ends, said side and end walls having upper and lower wall portions, said upper wall portions being offset laterally outwardly from said lower wall portions, a continuous shelf joining said upper and lower wall portions intermediate the open top and the bottom of said receptacle, said continuous shelf providing means for supporting a first set of foraminous cribs side by side transversely within said receptacle, a continuous lip at the top of said receptacle extending laterally outwardly from said side and end walls, said continuous lip providing means for supporting a second set of foraminous cribs superimposed over said first set of cribs, and an integral continuous flange depending from said lip at its outer edge constituting a barrier to shellfish predators which are by nature bottom dwellers in tidal and intertidal seawaters.

11. The apparatus according to claim 10 wherein said continuous lip has a plurality of spaced holes therein.

12. The apparatus according to claim 10 wherein said receptacle bottom has drain opening means therein which may be selectively opened or closed, said receptacle bottom, side walls and end walls being otherwise imperforate.

13. Apparatus for sustaining the growth of oysters and other molluscs in multiple water environments comprising an elongated open-top receptacle which can be moved and placed on any form of coastal or estuarine bottom strata with tidal seawater flows containing adequate nutrients and other marine environmental requirements for the growth of oysters and other molluscs, and multiple foraminous cribs for containing oysters and other molluscs of various sizes for off-bottom rearing and maturing to marketable qualities, said receptacle having a bottom, opposite side walls and end walls extending upwardly from said bottom, support means therein for supporting and protectively housing a first set of said foraminous cribs below the open top of said receptacle, and support means at said open top for supporting a second set of said cribs superimposed over said first set of cribs, said first set of cribs having smaller size openings than the openings of said second set adapting said first set of cribs to contain oysters of a smaller size than the cribs of said second set, said means for supporting said first set of cribs comprising a continuous shelf formed within said receptacle, and said means for supporting said second set of cribs comprising a continuous lip extending outwardly from said side and end walls, said lip having an integral flange depending therefrom at its outer edge which constitutes a barrier to shellfish predators which are by nature bottom dwellers in tidal and intertidal seawaters.

14. Apparatus for sustaining the growth of oysters and other molluscs in multiple water environments comprising an elongated open-top receptacle which can be moved and placed on any form of coastal or estuarine bottom strata with tidal seawater flows containing adequate nutrients and other marine environmental requirements for the growth of oysters and other molluscs, and multiple foraminous cribs for containing oysters and other molluscs of various sizes for off-bottom rearing and maturing to marketable qualities, said receptacle having a bottom, opposite side walls and end walls extending upwardly from said bottom, support means therein for supporting and protectively housing a first set of said foraminous cribs below the open top of said receptacle, and support means at said open top for supporting a second set of said cribs superimposed over said first set of cribs, said first set of cribs having smaller size openings than the openings of said second set adapting said first set of cribs to contain oysters of a smaller size than the cribs of said second set, said means for supporting said first set of cribs comprising a continuous shelf formed within said receptacle, and said means for supporting said second set of cribs comprising a continuous lip extending outwardly from said side and end walls, said lip having a plurality of apertures therein, and lashings secured to said lip through said apertures in said lip for lashing said second set of cribs to the top of said receptacle.

15. The apparatus of claim 14 wherein at least one rope loop is attached to one end of said receptacle through selected apertures in said lip, and a marker buoy is connected to said rope loop by a rope leader.

* * * * *